July 19, 1966  J. L. CRONK ET AL  3,261,310
PLANTER FOR SEEDLING TREES
Filed Feb. 28, 1964  6 Sheets-Sheet 1
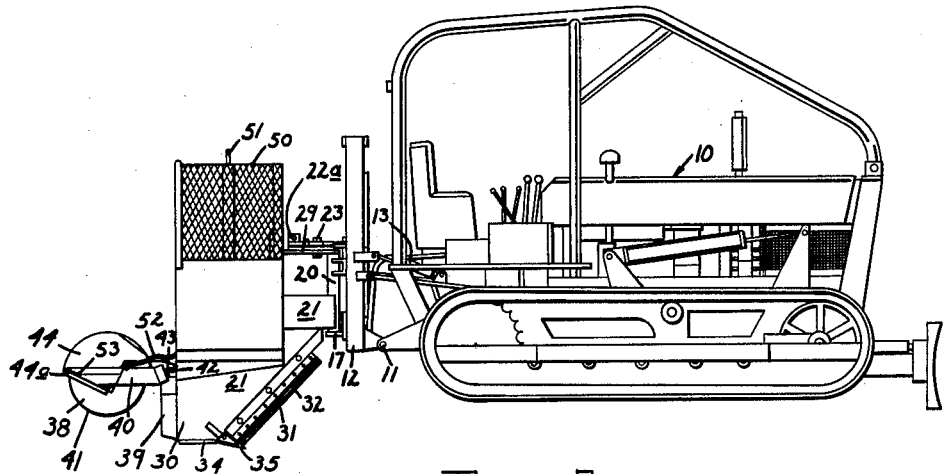
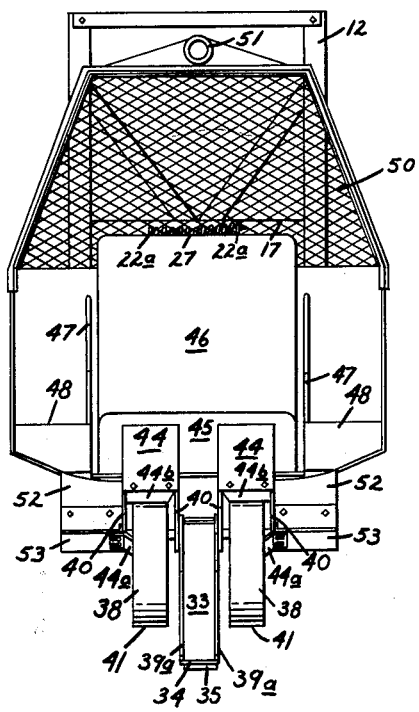
INVENTOR.
JACK L. CRONK
JAMES L. THURMOND
BY
ATTYS.

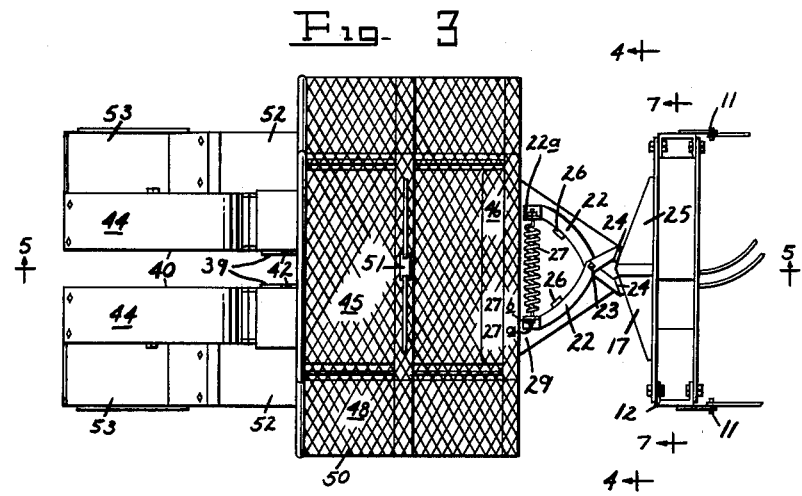
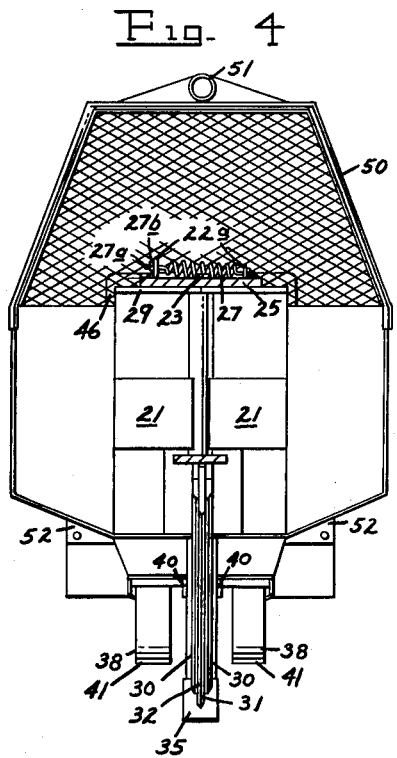

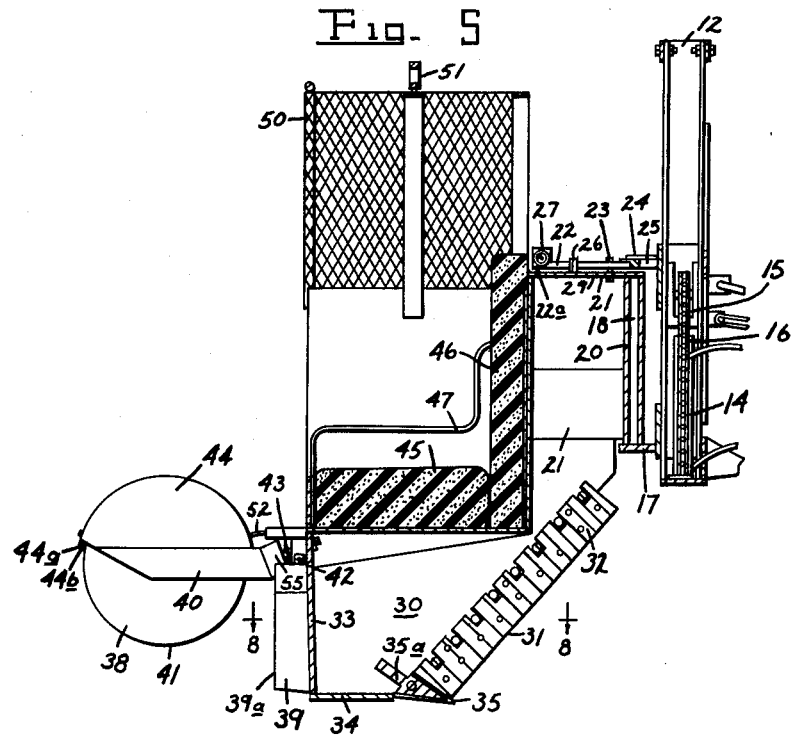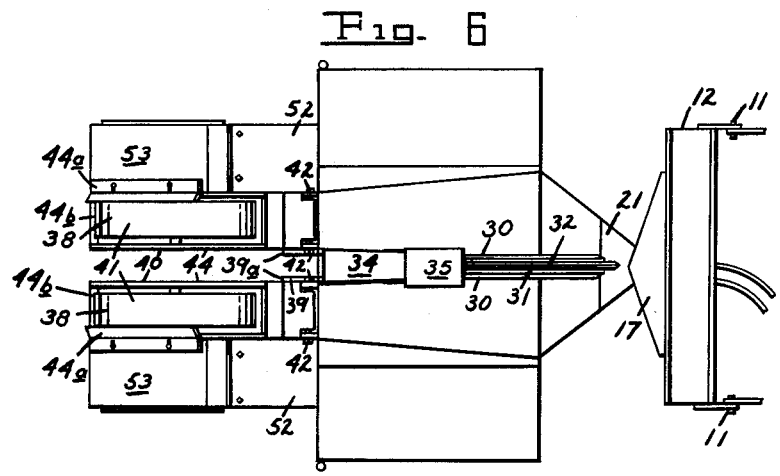

July 19, 1966  J. L. CRONK ETAL  3,261,310
PLANTER FOR SEEDLING TREES
Filed Feb. 28, 1964  6 Sheets-Sheet 4

INVENTOR.
JACK L. CRONK
JAMES L. THURMOND
BY
ATTYS.

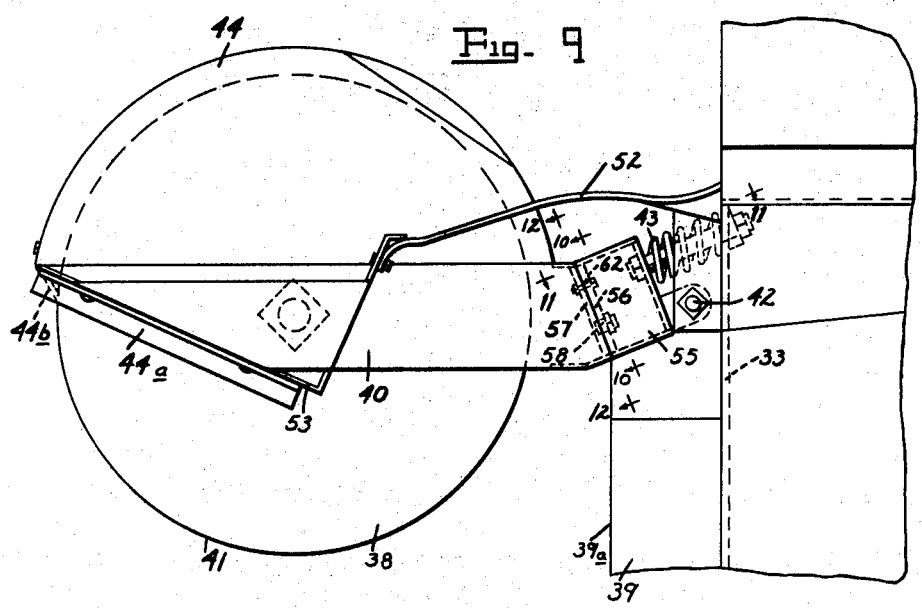
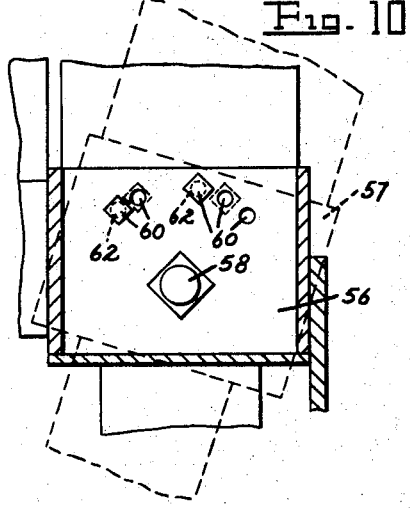
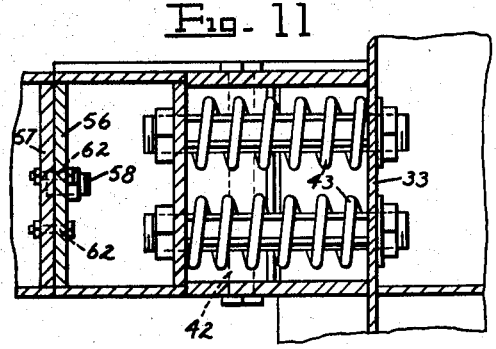
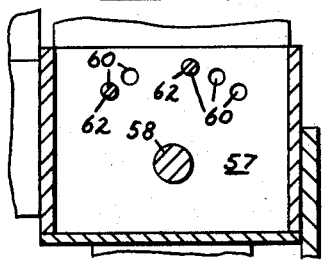

July 19, 1966 J. L. CRONK ET AL 3,261,310
PLANTER FOR SEEDLING TREES
Filed Feb. 28, 1964 6 Sheets-Sheet 6
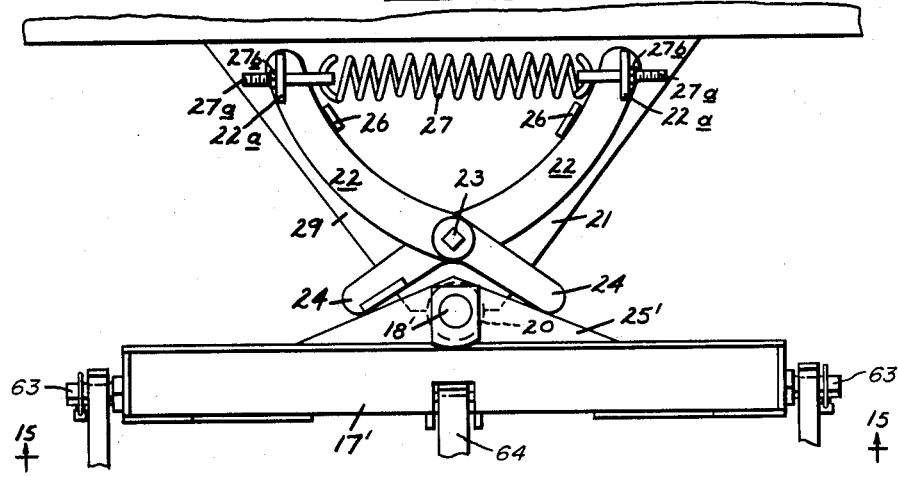
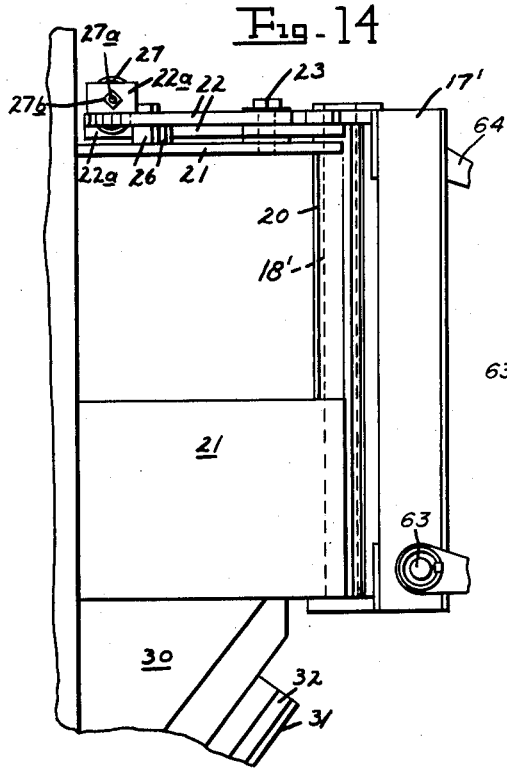
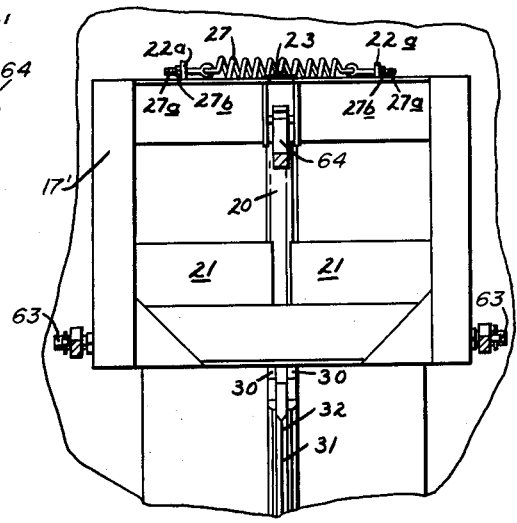
INVENTOR.
JACK L. CRONK
JAMES L. THURMOND
BY
*Wells & St.John*
ATTYS.

United States Patent Office 3,261,310
Patented July 19, 1966

3,261,310
PLANTER FOR SEEDLING TREES
Jack L. Cronk, 5600 Hill Road, and James L. Thurmond, c/o Idaho Tractor Co., 2124 Sunrise Rim, both of Boise, Idaho
Filed Feb. 28, 1964, Ser. No. 348,095
3 Claims. (Cl. 111—3)

This invention relates to a novel planter for seedling trees, and more particularly to a planter adapted to seed cut or replant fallen forests.

The present device is designed primarily for the seeding of natural hillsides and forests, where the main growth of the forest has been eliminated by natural disaster or by harvesting of the trees. The invention contemplates a rugged planting arrangement drawn behind a tractor, whereby such areas can be reseeded without generally disturbing the terrain or natural contour of the surrounding areas.

It is a first object of this invention to provide such a planter that can be readily mounted on a conventional tractor, and which can be drawn about the area to be replanted, utilizing a single man for the planting of a row of trees, and one additional person to operate the tractor.

Another object of this invention is to provide such a planter having the capacity to dig through normal soil conditions, without riding over areas of greater density or minor obstructions. Provision is made for allowing the planter to ride over major obstacles.

Another object of this invention is to provide a safe mechanism by which a person can manually place seedling trees in an open trench.

One further object of the invention is to provide such a planter that will continuously open a trench for the reception of seedling trees, and which will crowd the soil about the roots of the newly planted seedling trees without damaging their delicate root structures.

The exemplary apparatus described in detail below, and illustrated in the drawings, is not intended to limit or restrict the scope of the invention, which is set out in the claims following this disclosure. Various equivalent mechanisms and structures can be substituted in place of those shown without deviating from the basic concept of this arrangement.

In the drawings:

FIGURE 1 is a side view of the apparatus carried by a tractor, with the planter shown in operational position relative to the tractor elevation on a ground surface;

FIGURE 2 is an enlarged rear view of the planter as seen in FIGURE 1;

FIGURE 3 is a top view of the planter;

FIGURE 4 is a front view of the planter as seen along line 4—4 in FIGURE 3;

FIGURE 5 is a longitudinal sectional view of the apparatus as seen along line 5—5 in FIGURE 3;

FIGURE 6 is a bottom view of the apparatus;

FIGURE 9 is an enlarged fragmentary elevation view of one packing wheel and its mounting apparatus;

FIGURE 10 is an enlarged fragmentary view taken along line 10—10 in FIGURE 9, and illustrating an alternate wheel position in dashed lines;

FIGURE 11 is an enlarged view of the wheel mounting as seen along line 11—11 in FIGURE 9;

FIGURE 12 is an enlarged fragmentary sectional view taken along line 12—12 in FIGURE 9;

FIGURE 13 is an enlarged fragmentary top view of an alternate hitch showing the stabilizer assembly;

FIGURE 14 is a fragmentary side view of the apparatus shown in FIGURE 13; and

FIGURE 15 is an elevation view taken along line 15—15 in FIGURE 13 at a reduced scale.

Figure 7:
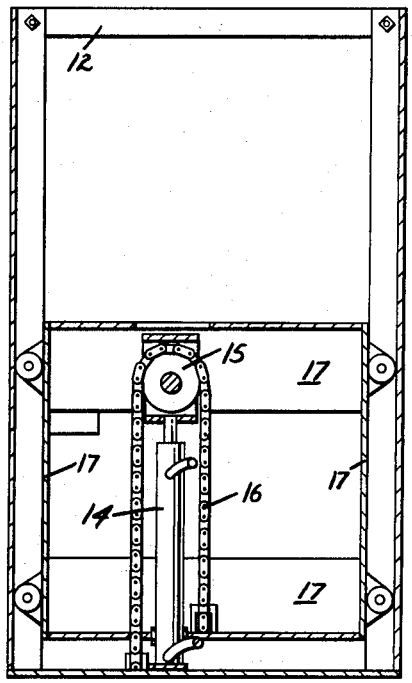
FIGURE 7 is a sectional view taken along line 7—7 in FIGURE 3.
Figure 8:
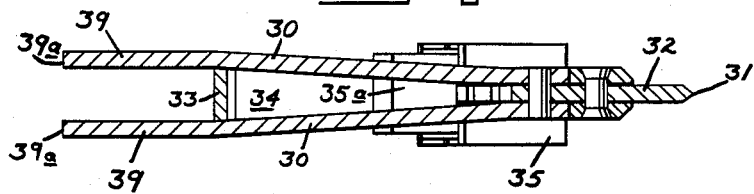
FIGURE 8 is a sectional view of the trench opener as seen along line 8—8 in FIGURE 5.

The planter constructed according to this invention comprises a rather small unit adapted to be carried at the rear of a conventional tractor generally designated in the drawings by the numeral 10. In a first form of hitch seen in FIGURES 1-7, the tractor 10 mounts the planter about a rear horizontal pivot axis 11 on the tractor frame, carrying an upright rigid rectangular frame 12 by means of the pivot axis 11. Auxiliary hydraulic cylinders 13 serve to selectively position the frame 12 about the axis 11. The entire planter is slidably mounted relative to the rectangular frame 12 for elevational motion relative to the tractor 10. The apparatus is shown in FIGURE 1 at its lowest elevation, wherein it will continuously dig a trench behind the tractor.

The basic arrangement by which the elevation of the planter is controlled can best be seen in FIGURES 5 and 7. As shown, a simple hydraulic cylinder 14 is anchored to the base of the frame 12, and carries a pulley 15 at the upper end of its reciprocable piston rod. The pulley 15 engages a chain 16 that has one end anchored to the base of the frame 12, and the remaining end thereof anchored to the base of a vertically movable framework generally shown as 17. The movable framework 17 can thus be raised or lowered by moving the piston of the hydraulic cylinder 14, causing the chain 16 to carry framework 17 twice the distance traveled by the piston of the cylinder assembly 14. The framework 17 is guided by the supporting framework 12 for proper positioning of the planter in an upright position.

Mounted on the framework 17 is an upright king pin 18 surrounded by a collar 20. The collar 20 carries the supporting framework 21 of the planter mechanism, which is basically a box-like framework pivotally mounted on the pin 18 for movement about the axis thereof. Pivotal movement of the frame 21 relative to the framework 17 is resisted by a spring biased stabilizer assembly at the top surface of the framework 21, best seen in FIGURES 3, 4, 13, 14 and 15. This stabilizer assembly comprises a pair of levers 22 pivoted about a common axis 23. Each of the levers 22 has a forward end 24 that abuts one side of a triangular member 25 protruding rearwardly from the upper surface of the vertically adjustable framework 17. The same member 25 carries the upper end of pin 18. The levers 22 also abut fixed stops 26 on the upper plate 29 of framework 21. The rear ends of the levers 22 are connected by means of a simple tension spring 27 through upstanding ears 22a. Thus, any tendency of the framework 21 to pivot about the axis of pin 18 will be resisted by the spring 27, which will normally tend to center the framework 21 relative to the guiding framework 17, which will naturally follow the direction of the tractor 10. The levers 22 permit free turning of the framework 21 when required by turns, etc., but normally urge the framework 21 in an in-line position relative to the towing tractor 10. Tension of spring 27 can be varied by means of threaded bolts 27a at each end of spring 27 and nuts 27b that abut ears 22a.

Mounted below the framework 21 are two plates 30 which depend downwardly below the normal ground surface traversed by the tractor 10 when the framework 21 is in its operational position illustrated in FIGURE 1. The plates 30 are symmetrical about a central longitudinal plane, and complement one another to form a trench opener. Plates 30 converge forwardly toward a front edge 31 which extends downwardly and rearwardly relative to the framework 21, and which is reenforced by a replaceable blade 32. The plates 30 are solid metal plates, and terminate rearwardly in parallel wall sections 39 having an open rear edge 39a. The plates 30 are reenforced by means of an upright transverse partition 33 that spans the separation between plates 30, and by enclosed lower plate 34 that prevents an accumulation of trash within the lower portions of the space defined between the plates 30.

Mounted at the exterior of plates 30 is a replaceable rectangular cutting bit 35 having a top surface that is directed downwardly and forwardly at an angle perpendicular to the front edge 31 of the plate structure. The width of the plate 35 is substantially the width between the parallel wall sections 39 of the plate 30. Bit 35 is removably secured to a complementary mounting element 35a welded across the plates 30 (FIGURE 5).

Extending rearwardly from the plate 30 are two packing wheels 38 mounted on individual carrying frames 40. The wheels 38 are provided with flat peripheral surfaces 41 that tend to crowd soil downwardly and inwardly between the space defined by the plates 30. The two wheels 38 are located outwardly adjacent to the wall sections 39 of the plates 30, so that after opening of the trench by the passage of the plates 30 and bit or plate 35, the wheels 38 can pack loose soil back toward the bottom of the open trench.

The wheel frames 40 that carry the wheel axles are individually supported on the basic framework 21 of the planter for rotation about transverse pins 42 carried on the partition 33. The frames 40 are biased downwardly about their pivot axes by means of enclosed compression springs 43 that bear between the basic framework 21 and the wheel frames 40. The wheels 38 have their upper portions covered by a protective fender 44 that also serves to maintain the wheels 38 in clean condition, due to the close proximity of the fender 44 to the outside surfaces of the wheels 38. Scrapers 44a and 44b rub against the peripheral and outside surfaces of wheels 38, respectively. In this manner, an accumulation of mud or other trash on the wheels 38 is prevented.

In order to provide additional control of the operator over the soil pressure directed toward the roots of newly planted seedlings, it is preferable to pivotally mount wheels 38 about axes parallel to the longitudinal direction of movement of the planter. As shown in FIGURES 9–11, this is easily accomplished by forming a two piece frame 40, including a bracket 55 that is pivoted about the pin 42 described above. A rear plate 56 serves as the support for a similar plate 57 fixed upon the main wheel support. Plate 57 has a forwardly protruding lug 58 that serves as its pivot relative to plate 56. A series of similar radial apertures 60, 61 are formed on plates 56, 57 respectively, centered about the center of lug 58. Thus, the plate 57 and the wheel structure carried thereby can be selectively pivoted about lug 58 and secured in the desired angular position by means of two bolts 62 (see FIGURE 10).

For planting purposes, it is contemplated that a person will manually place seedling trees between the wheels 38 at the front surfaces thereof. This is accomplished by one sitting on the rearwardly facing seat 45 fixed to the framework 21. The seat 45 is provided with a padded backrest 46 and protective sides 47. At each side of this seat 45 is a tray 48 on which seedling trees can be stored until planted. The seat 45 and the trays 48 are enclosed by a protective metal cage 50 which extends over the entire seat, so as to protect the user of the apparatus from flying objects and from other accidents that might occur if the seat were unprotected. At the top of the cage 50 is a hook 51 for convenient carrying of the planter by a hook or winch when desired.

In order to better accommodate a person sitting on the seat 45 there are provided leg rests 52, which are flexible, and anchored to both the framework 21 and individual foot rests 53 fixed to the outside surface of each fender 44. Thus, a person can sit on the seat 45 with his feet in the foot rests 53, thereby further serving to bias the wheels 38 downwardly due to the weight of the person's feet. The two wheels 38 are free to move vertically relative to one another in order to ride over rocks and other obstructions, and there is no connection between the wheels, thereby eliminating any hazard to the person's hands during placement of seedling trees in the open trench prior to closure of the trench by the wheels 38.

The above construction makes it possible for one man to plant a large quantity of trees on any type of hillside or terrain with a minimum of fatigue, since he sits in a comfortable rearwardly facing position and need not worry about his safety within the cage 50. The open packing wheels are completely visible and the operator's hand can pass between the wheels 38 without obstruction or injury. The reverse position of the seat 45 allows the person planting trees to completely observe the correct placement of the trees and the cover packed about their roots. The close proximity of the planter to the tractor hitch eliminates much of the normal whipping action of an apparatus drawn behind a tractor, particularly when the planter is lifted in the air to clear debris. This is further minimized by the biasing arrangement including levers 22 and spring 27. The short compact length of the planting apparatus provides better weight distribution, maneuverability and shorter turning radius.

The blade opener provided by the converging plates 30, bits 32 and 35 is capable of cutting through obstructions which a rolling coulter would tend to pass over. However, the long rearwardly extending surface of the plates 30 allows the planter to ride up and over objects impossible to cut through, this action being possible due to the vertical adjustability of the framework 17 relative to the supporting frame 12. The packing wheels 38 push the loose soil into the center of the trench after placement of the seedling trees, and forces it down for proper compaction at root level. In actual practice, this planter has been found capable of planting up to 1,000 trees per hour under average conditions.

In FIGURES 13–15 is shown a hitch for attachment to tractor 10 by use of a conventional three point hitch. This comprises a rectangular frame 17' having lower connections 63 and a central upper connection 64 to the usual tractor support linkages. The frame 17' has an upright king pin 18' as described previously, and a rearwardly directed triangular member 25' that engages the earlier described levers 22 of the stabilizer assembly.

Since many changes could be made in the details of this device without deviating from the basic scope of the concept described, such as the use of other wheel configurations in place of those shown in the drawings, the invention is not intended to be limited precisely to the structure just described. The following claims are presented as more accurate definitions of this invention.

Having thus described the invention, we claim:
1. A planter for seedling trees, comprising:
a mobile framework adapted to be drawn behind a tractor;
a downwardly and rearwardly directed edge on said framework formed by two solid plates leading smoothly rearward to a pair of transversely spaced upright wall sections, said plates and said wall sections extending downwardly from said framework below the normal ground surface encountered below said framework;
a generally rectangular blade fixed to the lower end of said edge having an upper surface protruding forwardly and downwardly therefrom at an angle perpendicular to said edge, the width of said blade being approximately the distance across said parallel wall sections;
and a pair of transversely spaced packing wheels mounted in side by side locations on said framework immediately rearward of said wall sections and adjacent each side thereof, said wheels being mounted for ground contact slightly below the ground surface elevation.

2. A planter for seedling trees, comprising:

a supporting rigid framework;

hitch means connected to said framework to elevationally support said framework at the rear of a tractor with said framework extending rearwardly therefrom and pivotally carried for motion about a vertical axis;

a pair of symmetrical upright metal plates fixed to said framework and extending downwardly therefrom below the ground surface when said framework is at its operational elevation relative to the tractor, said plates being located in side by side positions on said framework and converging forwardly to a downwardly and rearwardly directed front edge, said plates being open along their rear edges and defining transversely spaced parallel wall sections;

a solid blade member fixed to said plates at the lower end of said front edge and protruding forwardly therefrom, said blade having an upper rectangular surface substantially equal in width to the distance between said parallel wall sections and extending downwardly and forwardly relative to said front edge;

and a pair of transversely spaced packing wheels mounted on said framework rearward of said plates and outwardly adjacent thereto, said wheels being carried on said framework for ground contact, said wheels being mounted on said framework for pivotal adjustment about axes parallel to the intended direction of motion of the planter.

3. A planter for seedling trees, comprising:

a supporting framework adapted to be carried at the rear of a tractor, said framework extending rearwardly of the tractor directly over the ground surface to be planted;

a pair of symmetrical upright solid plates fixed to said framework and extending downwardly therefrom to a location below the ground surface, said plates being located in side by side positions on said framework and converging forwardly to a downwardly and rearwardly directed front edge;

a solid blade member fixed to said plates at the lower end of said front edge and protruding forwardly therefrom, said blade having an upper surface extending downwardly and forwardly relative to said front edge;

a pair of transversely spaced packing wheels mounted on said framework rearward of said plates and outwardly adjacent thereto, said wheels being carried on said framework for ground contact;

said wheels being independently carried on said framework by rearwardly extending frames pivoted about a transverse horizontal axis on said framework;

and biasing means yieldably connected between said wheel frames and said framework urging said wheels into ground contact.

References Cited by the Examiner

UNITED STATES PATENTS

| | | | |
|---|---|---|---|
| 1,313,453 | 4/1919 | Behlen | 280—488 |
| 2,584,012 | 1/1952 | Griffin | 111—85 |
| 2,705,648 | 4/1955 | McCleskey | 280—488 |
| 2,791,192 | 5/1957 | Ryding | 111—3 |
| 2,832,382 | 4/1958 | Lahar | 172—508 X |
| 2,887,075 | 5/1959 | Linkogel | 111—3 |
| 3,108,551 | 10/1963 | Wilson | 111—3 |
| 3,170,421 | 2/1965 | Norris et al. | 111—85 X |

FOREIGN PATENTS 941,264   11/1963   Great Britain.

ABRAHAM G. STONE, *Primary Examiner.*

ANTONIO F. GUIDA, *Examiner.*

W. A. SMITH III, *Assistant Examiner.*